US008977951B2

(12) United States Patent
Ethier et al.

(10) Patent No.: US 8,977,951 B2
(45) Date of Patent: Mar. 10, 2015

(54) METHODS AND APPARATUS FOR AUTOMATED WIZARD GENERATION

(75) Inventors: Christopher H. M. Ethier, Ottawa (CA); Trevor H. Ward, Kars (CA); Keith R. McLellan, Ottawa (CA); Anthony R. Rumsey, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 1609 days.

(21) Appl. No.: 11/507,863

(22) Filed: Aug. 21, 2006

(65) Prior Publication Data
US 2013/0198628 A1    Aug. 1, 2013

(51) Int. Cl.
*G06F 17/00*    (2006.01)
*G06F 3/0484*    (2013.01)
*G06F 17/24*    (2006.01)

(52) U.S. Cl.
CPC ............ *G06F 3/0484* (2013.01); *G06F 17/243* (2013.01)
USPC ........... 715/222; 715/272; 715/273; 715/274; 715/275; 715/276; 715/277; 715/762; 715/240; 715/241; 715/242; 715/243; 715/244; 715/245; 715/246; 715/247

(58) Field of Classification Search
CPC .... G06F 17/243; G06F 17/247; G06F 17/248
USPC .......... 715/762, 200, 240–247, 272–277, 222
See application file for complete search history.

(56) References Cited

U.S. PATENT DOCUMENTS

| | | | |
|---|---|---|---|
| 5,347,629 A * | 9/1994 | Barrett et al. ................ | 715/762 |
| 6,574,791 B1 * | 6/2003 | Gauthier et al. .............. | 717/107 |
| 7,000,220 B1 | 2/2006 | Booth | |
| 7,779,085 B2 | 8/2010 | Neil et al. | |
| 2002/0078103 A1 | 6/2002 | Gorman et al. | |
| 2003/0074636 A1 * | 4/2003 | Manepalli ..................... | 715/513 |
| 2003/0131312 A1 * | 7/2003 | Dang ............................ | 715/500 |
| 2003/0149761 A1 * | 8/2003 | Baldwin et al. .............. | 709/224 |
| 2004/0083474 A1 | 4/2004 | McKinlay et al. | |
| 2004/0130572 A1 * | 7/2004 | Bala .............................. | 345/762 |
| 2004/0205529 A1 * | 10/2004 | Poulose et al. ............... | 715/506 |
| 2006/0136422 A1 * | 6/2006 | Matveief et al. .............. | 707/10 |
| 2006/0242180 A1 * | 10/2006 | Graf et al. .................... | 707/101 |
| 2007/0032287 A1 | 2/2007 | Osawa | |
| 2007/0250783 A1 * | 10/2007 | Wu et al. ...................... | 715/762 |
| 2007/0282486 A1 | 12/2007 | Walker et al. | |
| 2008/0028401 A1 | 1/2008 | Geisinger | |
| 2008/0098291 A1 * | 4/2008 | Bradley et al. ............... | 715/223 |
| 2008/0104146 A1 | 5/2008 | Schwaab et al. | |

(Continued)

OTHER PUBLICATIONS

OACS PCT Quick Reference Guide ("OACS PCT Quick Reference Guide") Published May 2002—Version 3 by SIRA pp. 6.*

(Continued)

*Primary Examiner* — Quoc A Tran
(74) *Attorney, Agent, or Firm* — Kilpatrick Townsend & Stockton LLP

(57) ABSTRACT

A system receives an identification of an electronic form that contains a set of objects. At least one object allows a user, via a graphical user interface, to provide input to the object. The system identifies a set of objects from the electronic form to be included within a panel used by a wizard to complete the electronic form. The system generates the panel for presentation by the wizard. The panel allows the user to provide input to those objects on that panel.

23 Claims, 15 Drawing Sheets

(56) References Cited

U.S. PATENT DOCUMENTS

| | | | |
|---|---|---|---|
| 2009/0177961 A1* | 7/2009 | Fortini et al. | 715/239 |
| 2010/0042919 A1 | 2/2010 | Meyer | |
| 2010/0070945 A1* | 3/2010 | Tattrie et al. | 717/101 |
| 2013/0198714 A1 | 8/2013 | Moody et al. | |

OTHER PUBLICATIONS

"OACS PCT Quick Reference Guide" Published May 2002—Version 3 by SIRA pp. 6.*

United States Patent and Trademark Office, Office Action, U.S. Appl. No. 13/250,469, dated Apr. 25, 2013.

States Patent and Trademark Office, Office Action, U.S. Appl. No. 11/949,678, mailed Jul. 26, 2011.

United States Patent and Trademark Office, Office Action, U.S. Appl. No. 11/949,678, mailed Aug. 26, 2013.

United States Patent and Trademark Office, Office Action, U.S. Appl. No. 11/949,678, mailed Jan. 31, 2013.

United States Patent and Trademark Office, Office Action, U.S. Appl. No. 11/949,678, mailed Feb. 1, 2012.

United States Patent and Trademark Office, Office Action, U.S. Appl. No. 13/250,469, mailed Nov. 15, 2013.

Wang et al., "Runtime Software Architecture Based Software Evolution and Adaptation", COMPSAC, 2003,.

* cited by examiner

FIG. 3

METHODS AND APPARATUS FOR AUTOMATED WIZARD GENERATION

BACKGROUND

Conventional computerized devices, such as personal computers, laptop computers, and the like utilize graphical user interfaces in applications such as operating systems and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects (i.e., radio buttons, check boxes, form fields, drop down menus, etc) on a computer display. The graphical objects are often represented as icons and the user can operate an input device such as a mouse to move a mouse pointer onto an icon (i.e., graphically overlapping the icon) on the graphical user interface. By depressing a mouse button, the application such as the operating system desktop selects the icon and if the user maintains the mouse button in a depressed state, the user can drag the icon across the graphical user interface. By releasing the mouse button, the icon is placed on the graphical user interface at the current position of the mouse pointer.

Most conventional document editors also allow users to create a document, or form, with areas that are editable by a user. For example, a form (whether a paper form or an electronic form) can have check boxes or radio buttons for a user to select, or form fields for to fill with information. Forms can be used (and may be required) to open bank accounts, apply for credit cards, apply for a job, file taxes, etc. Once a form is created using a form editor, the editor or another software program can be used to allow users to complete or "fill out" the form. This process entails the user visiting each field of the form and providing the requested information.

To assist users in completing form fields of a form, conventional software applications sometimes provide a "wizard" that "walks" (i.e., prompts) the user, usually in a step-by-step or field by field manner, through each of the form fields and allows the user to enter data for those fields. As the user progresses through the wizard, the wizard uses the data provided by the user to populate the various form fields of the form for which the wizard is designed. A wizard can have one or more panels (e.g. screens, dialog boxes or pop-up windows) that provide instructional help in an application, system development environment, form, etc. For example, a sequence of wizard panels can guide a user in completing a complex form, for example, by displaying a series of multiple-choice questions to which the user responds via graphical selections or other data entry into the graphical user interface. The wizard can use the data input from the user to populate the form. The form can then be printed, saved to storage, transmitted, etc, depending upon the purpose or application associated with the form.

Wizards can be of enormous help by providing additional information to the user to assist in obtaining the most accurate information for correct completion of a form. As an example, wizards can be an efficient method of obtaining information for a form in that data that is repetitively entered into a form can be collected once via a wizard, and populated in the form multiple times. A form wizard thus removes the sometimes daunting task of a user completing a form on their own by prompting the user for data for each field in a more controlled and sequenced presentation that can provide supplemental information to the user to indicate, for example, data formats or purposes of each form field, detailed field instructions, and the like.

SUMMARY

Conventional technologies for creating wizards that assist users of computer systems in the population of electronic forms (sometimes referred to as paper forms, though the fields are displayed and populated using a computer system within a graphical user interface) suffer from a variety of deficiencies. In particular, conventional technologies related to creation of wizards are limited in that each wizard panel (i.e. each window, pop-up or dialog box that a user experiences during use of the wizard) must be individually coded by the wizard developer. While it is possible to re-use wizard panel code, and make small modifications to existing code for one panel to create a new panel, conventional technologies do not provide a method of automatically generating wizard panels without writing any code. Accordingly, when creating wizard panels from an electronic form, each panel has to be individually created by a developer. The layout of the wizard panels may or may not be based on the layout of the electronic form and the wizard design is largely left up to the developer who codes the wizard. This can be problematic if wizard panel consistency is important since developer error might introduce inconsistencies in wizard panel presentation, look and feel and the like.

A developer creating the wizard panels must also code a navigation guide associated with the wizard panels. A navigation guide lists the panels in a hierarchy, and groups the panels by sections. For example, there may be three wizard panels associated with a particular page of the electronic form, and there may exist a required order or sequence to which the wizard panels must be presented to a user. A set of wizard panels that guide a user through withdrawing money out of a bank account may first require the user to specify a bank account from which to make the withdrawal prior to presenting, to the user, the amount of money available for withdrawal. Additionally, any validation rules associated with the electronic form, for example, requiring that a valid email be entered into the electronic form, must be coded into the wizard panel and are not automatically propagated to the wizard panel. Once the wizard panels are created, data entered into the wizard panels does not automatically populate the electronic form. Rather, the developer must develop code to channel or transfer the wizard provided data into the correct form fields. Conventional wizard creation techniques thus require intricate developer capability and do not provide a consistent mechanism to create wizards.

Embodiments disclosed herein significantly overcome such deficiencies and provide a system that includes a computer system executing a wizard generating process that generates wizard panels without writing software code. The wizard generating process creates panels (e.g., dialog boxes, pop-up windows, or other prompts) for a wizard (also referred to as an interactive guide) from an electronic paper form in a highly structured and simplified manner that allows an unsophisticated user (i.e. a non-developer) to create wizards (i.e. interactive guides) for electronic paper forms without advanced training. In addition, the system disclosed herein includes automatic creation of a navigation guide associated with the wizard panels. Embodiments disclosed herein overcome many deficiencies by generating the document or form model of the original form and running it as a UI less model (headless). The fields on the panels bind against the same form model as the original document, and give the document/ form an alternate visualization. In this way all the validations/calculations/picture clauses/data schema of the original document remains consistent when running the panel/wizard view.

In an example operation, the wizard generating process identifies objects on a form, such as form fields, radio buttons, images, text, etc., and creates panels for those objects, based on those objects within the electronic form, without any additional coding required. In other words, configurations disclosed herein can analyze an electronic form to identify those fields or selection areas that a user can complete using, for example, an online form editor or form completion application. From this analysis, the wizard generation process can create a wizard that operates as an interactive guide to prompt the user for those form fields within a sequence of panels such as dialog boxes presented via a graphical user interface. This allows a user, such as a forms developer, to create a form, and then have the wizard for that form be generated in a highly automated manner without requiring detailed programming knowledge. The wizard generation process allows the user to determine which form fields (i.e. objects) go within which panels, and allows the user to change other aspects of the form fields, such as providing context sensitive help, layout, and prompt text for each field. Any validation that the form provides for field data input by a user can be carried into the wizard that the wizard generation tool produces.

In one configuration, the user who controls the wizard generating process is able to graphically select and identify which form fields are to be included within which panels created by the wizard generating process. The wizard generating process provides the capability to modify the original form field layout or presentation sequence, if necessary. The wizard generating process can also identify and propagate any validation rules associated with the electronic form to the wizard panel. For example, one page of an electronic form may require that all the fields be filled in before continuing to the next page of the electronic form. The wizard generating process also provides the capability of adding additional navigation rules to the wizard panel. That is, the wizard generating process imports any validation rules from the paper form, and also allows a developer the means to add additional navigation rules. The navigation rules can be, for example, requiring a user to fill in all the form fields on the wizard panel before advancing to the next panel. The wizard generating process allows a developer-user to toggle between the electronic form view and the wizard panel view to observe how data inputted to a wizard panel will display on the electronic form, as well to observe how data input to the electronic form will display on the wizard panel. Toggling between the electronic form view and the wizard panel view does not result in any lost data.

In one configuration, the wizard generating process receives an identification of an electronic form that contains a set of objects. At least one object within the set of objects allows a user to provide input to the object via a graphical user interface (i.e. at least on object is a form field). The wizard generating process identifies a set of objects, from the electronic form, to be included within a panel used by a wizard to complete the electronic form. The wizard provided by the system disclosed herein is a presentation tool in the form of a graphical user interface that manages and controls wizard panel creation on behalf of a user who is creating the wizard for the particular selected electronic paper form. The wizard generating process generates the panel for presentation by the wizard. The panel allows a user to provide input to those objects on that panel (i.e., fill in field forms that were initially on the electronic paper form).

During an example operation of one embodiment, suppose a user is required to fill out an online application form when applying for a job. The online application form has several form fields that are required (to be filled in by the user), check boxes and radio buttons and the like. To create a wizard that guides the end-user through this form completion process, the wizard generating process disclosed herein identifies the form fields, check boxes, radio buttons, captions, etc., within the online application form, and generates wizard panels (without any additional coding) that accept input for filling in the online application form in an ordered manner. Any validation rules associated with the online application form (such as filling in a telephone number in a proper format) are propagated to the wizard panels. The developer can use a default wizard panel layout or create a new wizard panel layout. During wizard creation, the wizard generating process provides recommendations to the developer's created wizard panel layout. A developer can include additional rules to guide wizard operation based on user input. For example, if a user (filling out the online application form) indicates he/she has completed higher education, the wizard generating process can produce a wizard that selects an alternative panel that accepts information related to those degrees. If the user indicates no higher education, the wizard generating process can produce a wizard that bypasses those panels related to collecting education information, and instead, selects the panel that walks the user through his/her employment history. The wizard panels provide additional information that assist the user in filling out the online application form correctly, such as explanations of each form field, etc. The developer can toggle between the wizard panel view and the online application form view during creation of the wizard, and a user can perform similar actions during use of a wizard produced by the system disclosed herein.

The wizard generating process propagates redundant information, such as residential address versus a mailing address. That is, when a user enters a residential address into the wizard panel, and indicates that the user's residential address is the same as the user's mailing address, the wizard generating process can produce a wizard that propagates the user's residential information as input to the wizard panel that obtains the user's mailing address. Input to the wizard panels, provided by the user, is used to populate the online application form.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 is a screen shot of a wizard panel according to one embodiment disclosed herein.

DETAILED DESCRIPTION

Figure 1:
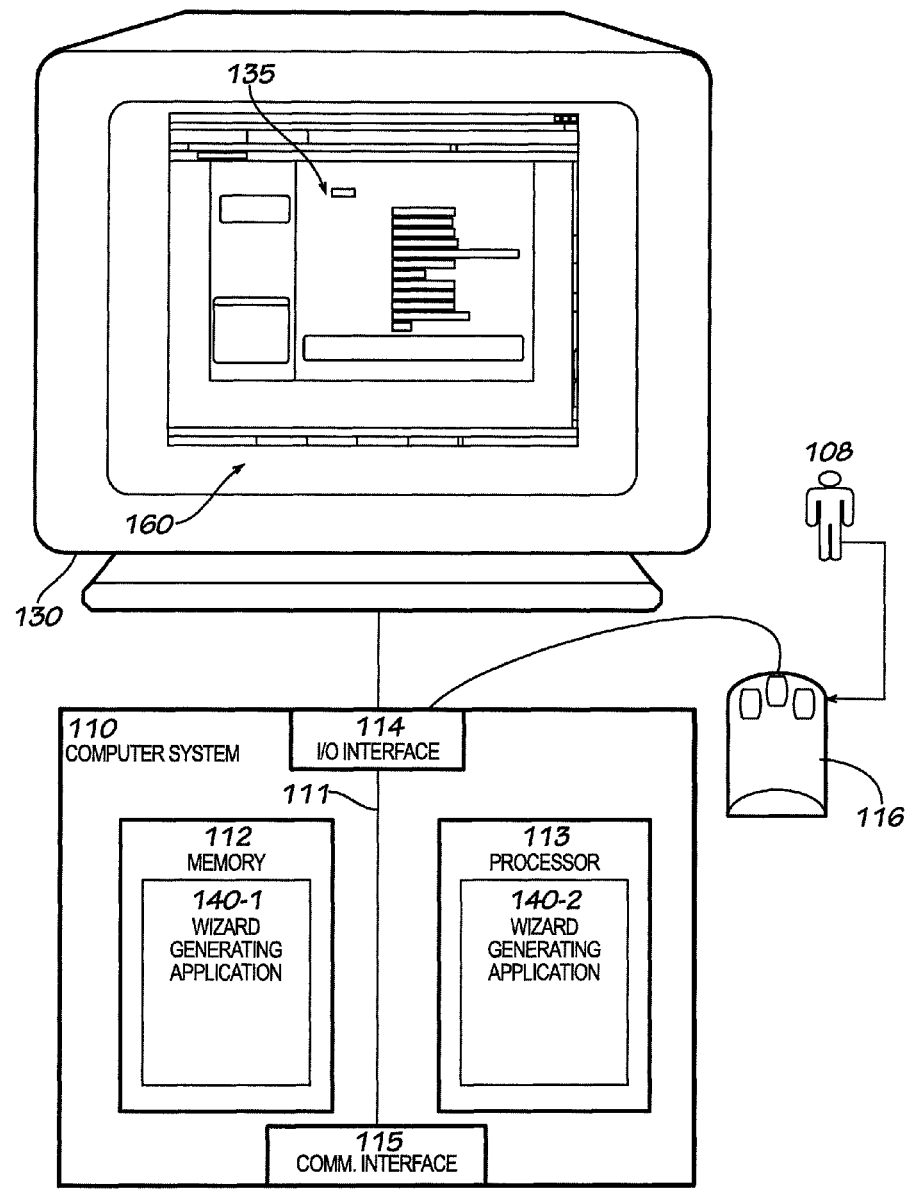
FIG. 1 shows a high level view of a document editor according to one embodiment disclosed herein.

Embodiments disclosed herein include a computer system executing a wizard generating process that generates wizard panels without a requirement of writing software code to generate an alternate user interface (UI). The wizard generating process creates wizard panels from an electronic paper form, and can further automatically create a navigation guide associated with the wizard panels. In operation, the wizard generating process identifies objects on the form, such as form fields, radio buttons, images, text, etc., and allows a wizard developer (e.g. a user creating a wizard) to create panels based on the objects in the electronic form without any additional coding required. The developer can specify which objects (e.g. form fields) from the form are to be included on a panel, and can specify the order of presentation and layout of those form fields. The wizard generating process provides the capability to modify the layout, if necessary, of each panel and of the overall sequence of panels presented during wizard creation. In one configuration, the wizard generating process can detect the layout of the fields as they appear on the form itself, and can duplicate this layout within a wizard panel so that a panel having fields form the form visually appears similar to the form layout. The wizard generating process also propagates any validation rules associated with the electronic form to the wizard panel during wizard creation so that such validation can be applied during use of the wizard for completion of the form fields. The wizard generating process predefines the layouts of the panels. However, the panels may be modified or new panels created by the wizard developer. For example, one page of an electronic form may require that all the fields be filled in before continuing to the next page of the electronic form. The wizard generating process also provides the capability of adding additional navigation rules to the wizard panel. That is, the wizard generating process imports any validation rules from the paper form, and also allows a developer the means to add additional navigation rules. The validation rules can be, for example, requiring a user to fill in all the form fields on the wizard panel before advancing to the next panel. The wizard generating process allows a developer to toggle between the electronic form view and the wizard panel view to observe how data input to a wizard panel will display on the electronic form, as well to observe how data input to the electronic form will display on the wizard panel. A developer can view multiple wizard views and switch between those multiple wizard views. One set of business rules and one data model drives the multiple wizard views. The wizard generating process provides and extends context sensitive and hyper linked help accessible via a URL.

The wizard generating process provides an automatic generation of a progress bar for form completion, as well as a printout of the paper form from the wizard view. Additionally, the wizard generating process provides the capability to save the wizard view as a PDF of the electronic paper form, and email that PDF from the wizard view.

According to the general operation of the system disclosed herein, the wizard generating process receives an identification of an electronic form that contains a set of objects. At least one object within the set of objects allows a user to provide input to the object via a graphical user interface. The wizard generating process identifies a set of objects, from the electronic form, to be included within a panel used by a wizard to complete the electronic form. The wizard generating process then generates the panel for presentation by a wizard that allows the wizard developer to modify panel layout and field presentation order, and other aspects of the panel. The panel is a dialog box, pop-up, window or other graphical user interface screen that allows a user to provide input to those objects on that panel during operation of a wizard created by the wizard generation process. It should be noted that the term user could apply to both a user (i.e., a programmer or developer) creating the wizard panels via the wizard panel generator, and the user (for example, an end user such as a client or customer) operating a wizard panel of a wizard produced using the wizard generation process.

Applications equipped with the wizard generating process can include, for example, word processors, web page editors, portable document format (PDF) document editors, software code editors, graphics editors, or the like.

FIG. 1 is a block diagram illustrating example architecture of a computer system 110 that executes, runs, interprets, operates or otherwise performs a wizard generating application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 to provide input commands and generally control the graphical user interface 160 that the wizard generating application 140-1 and process 140-2 provides on the display 130. In this example, the graphical user interface 160 displays the generated wizard panel 135-1, containing objects 125-N obtained from the electronic form 120. The communications interface 115 enables the computer system 110 to communicate with other devices (i.e., other computers) on a network (not shown). This can allow access to the wizard generating application 140-1 by remote computer systems and in some embodiments, the objects 125-N obtained from the electronic form 120 (of the form itself) can be obtained from a remote source via the communications interface 115.

The memory system 112 is any type of computer readable medium and in this example is encoded with a wizard generating application 140-1. The wizard generating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the wizard generating application 140-1. Execution of wizard generating application 140-1 in this manner produces processing functionality in the wizard generating process 140-2. In other words, the wizard generating process 140-2 represents one or more portions or runtime instances of the wizard generating application 140-1 (or the entire application 140-1) performing or executing within or upon the processor 113 in the computerized device 110 at runtime.

Figure 2:
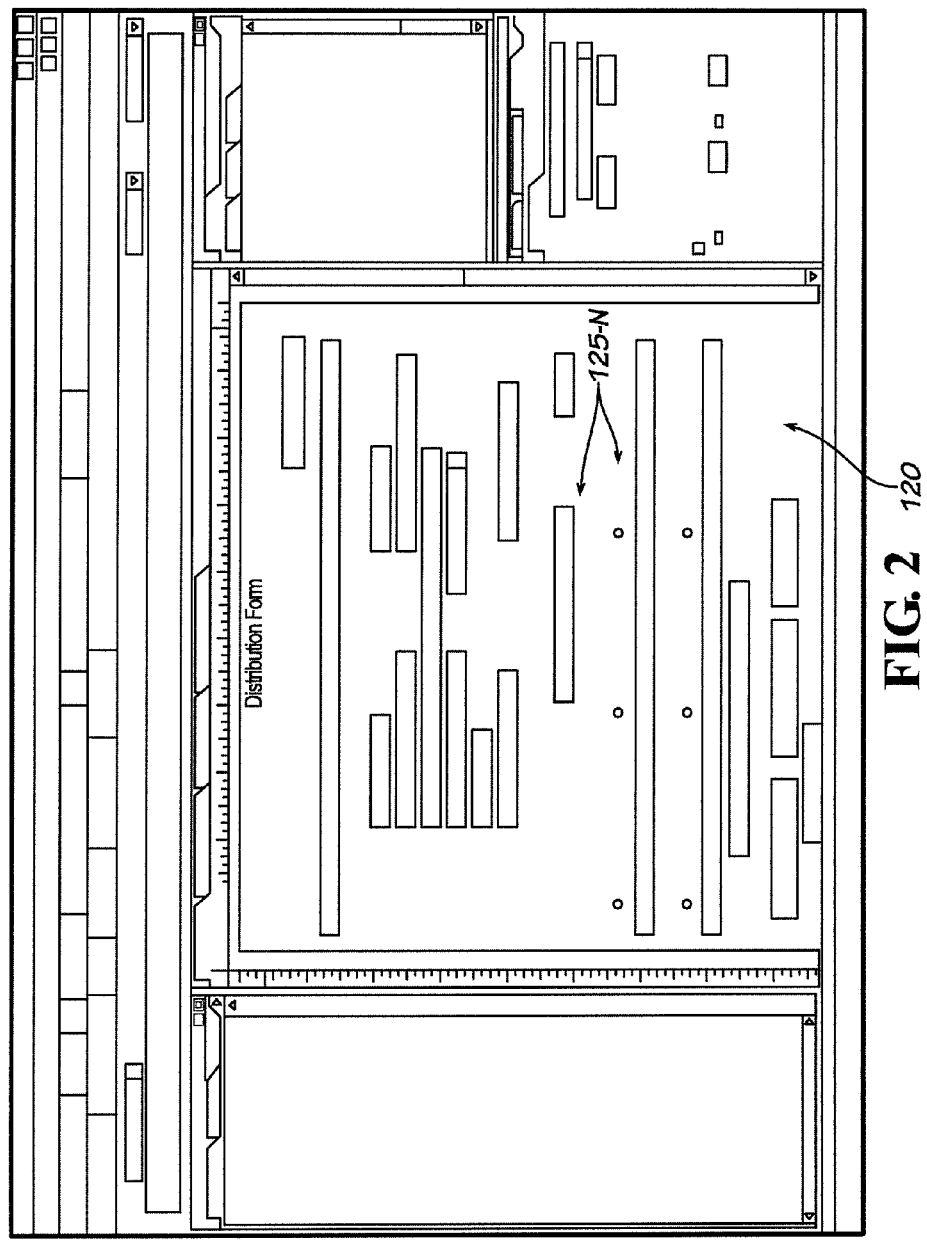
FIG. 2 is a screen shot of an electronic form, according to one embodiment disclosed herein.

FIG. 2 is an example screen shot of an electronic form 120. The electronic form 120 includes objects 125-N, such as form fields in which a user 108 (i.e. an end user completing the form) enters input (i.e., name, address, social security number, etc), radio buttons, check boxes, etc. In an example embodiment, the user 108 fills in the form fields, and makes selections from the radio buttons. When completed, the user 108 selects a button to advance to the next page in the electronic form 120. Some of the input entered by a user 108 may be re-used on subsequent pages of the electronic form 120. For example, a user's 108 name may appear on each page within the electronic form 120. The user 108 may fill out the electronic form 120 online, or a paper copy of the electronic form 120 may be printed out and filled out by hand.

Figure 3:
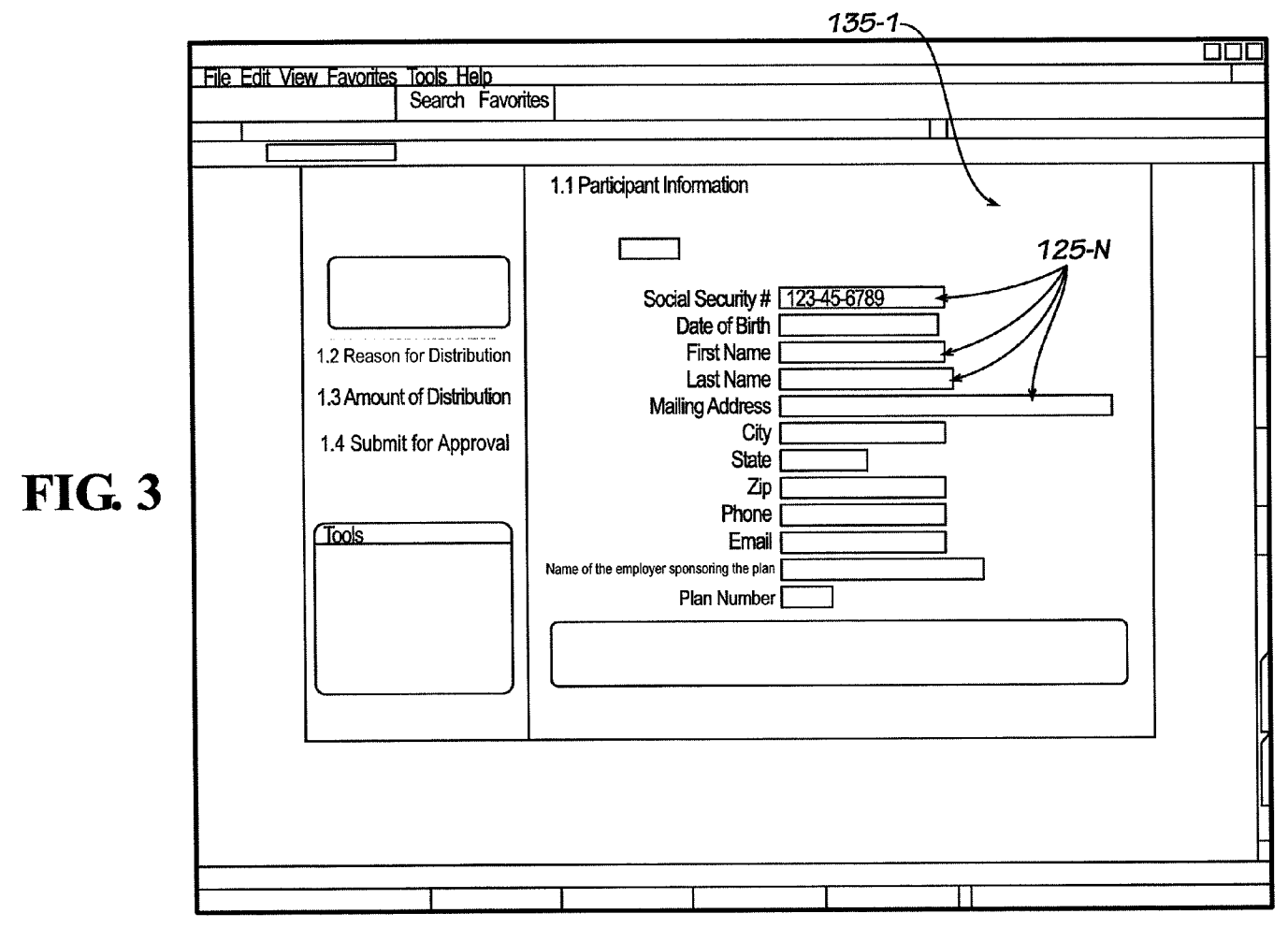

FIG. 3 is an example screen shot of a wizard panel 135-1 created by the wizard generating process 140-2 based on the electronic form 120. Creation of this panel will be described in detail shortly. The wizard panel 135-1 contains a set of objects 125-N. The sets of objects 125-N on the wizard panel 135-1 correspond to some or all of the objects 125-N on the electronic form 120. The wizard panel 135-1 also displays navigation information on the left hand side of the wizard panel 135-1. The navigation information allows the user 108 who is using the wizard to complete the electronic form 120 to view the sequence of wizard panels (i.e. past panels completed, current panel, and future panels to be presented) associated with the electronic form 120. The user 108 is able to see which wizard panel 135-1 in the sequence of wizard panels the user 108 is currently viewing. For example, when making a purchase online, navigation information can illustrate to a user 108 that there are five wizard panels to assist in completing an online purchase (such as verifying the shopping cart contents, supplying shipping and billing address information, selecting method of shipment, supplying payment information, and finally, submitting the order). In an example embodiment, context sensitive help information (not shown) can be displayed when a user 108 selects a form field (i.e., an object 125-1). Context sensitive help information could be, for example, a display of different types of shipping methods, and the associated shipping costs with those shipping methods.

Figure 4:
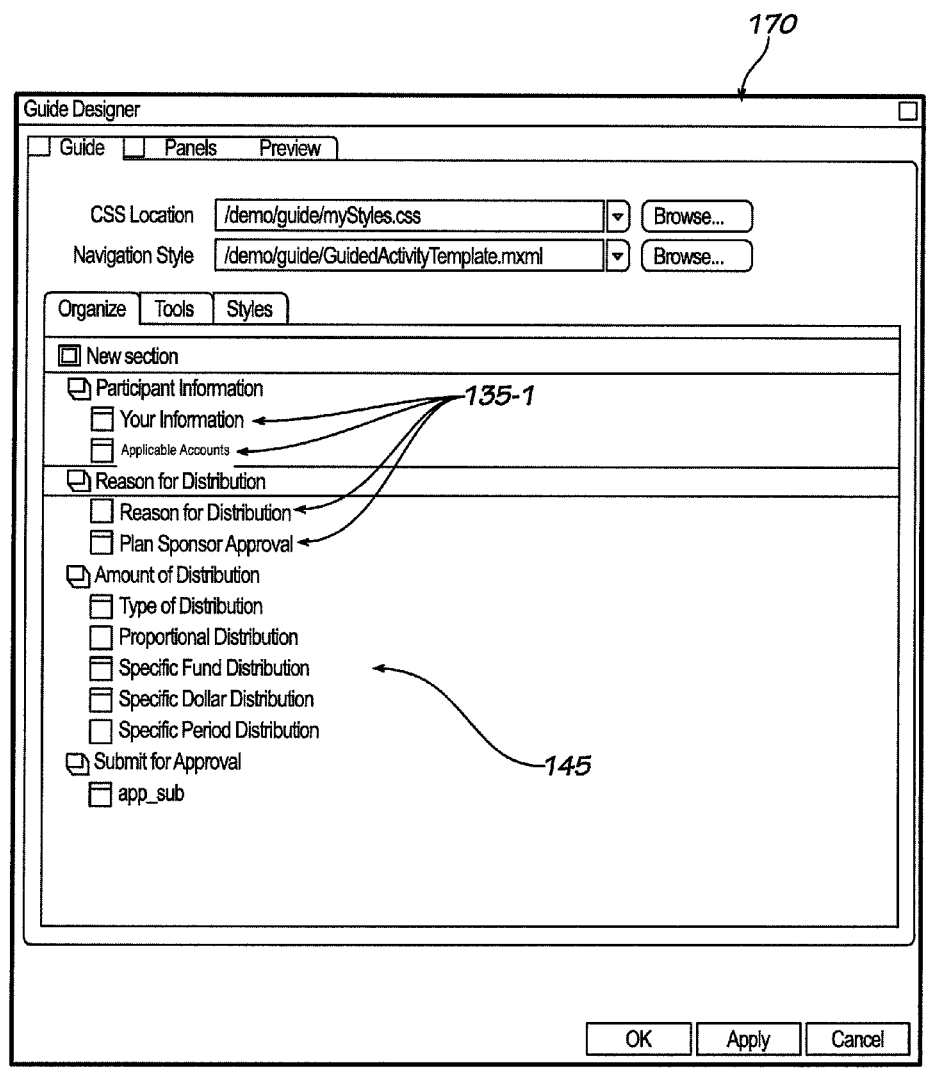
FIG. 4 is a screen shot of a wizard panel generator listing a plurality of wizard panels in a hierarchical order, according to one embodiment disclosed herein.

FIG. 4 is an example screen shot of a wizard panel generator 170 that operates as the wizard to manage creation of a wizard from a particular form 120. The wizard panel generator 170 displays a plurality of wizard panels in a hierarchical order 145. In this example, the wizard panels are grouped into sections related to different areas of the electronic form 120. The wizard panels are grouped in a hierarchical order 145, based on a sequence in which the wizard panels are presented to the user 108. It may be necessary to present the wizard panels to a user 108 in a particular sequence during operation of the wizard. For example, for a wizard that assists a user (i.e., a bank customer) in withdrawing money from a bank account, it is necessary to obtain a user password, login, and bank account number from the user prior to displaying the contents of the bank account in another panel. The wizard generating process 140-2 allows a user 108 (i.e., the developer generating the wizard panels 135) to organize the wizard panels by sections in any sequence regardless of sequence of pages within the electronic form 120 from which the wizard panels are generated. This example screen shot displays layout style information to be applied to all the wizard panels displayed within the wizard panel generator 170. The user 108, generating the wizard panels via the wizard generating process 140-2, can use the default layout style. The user 108 can also modify the available layout styles and create new layout styles for the wizard panels. The layout style of a wizard panel 135-1 can also include side tabs, tab navigator, accordion, etc.

Figure 5:
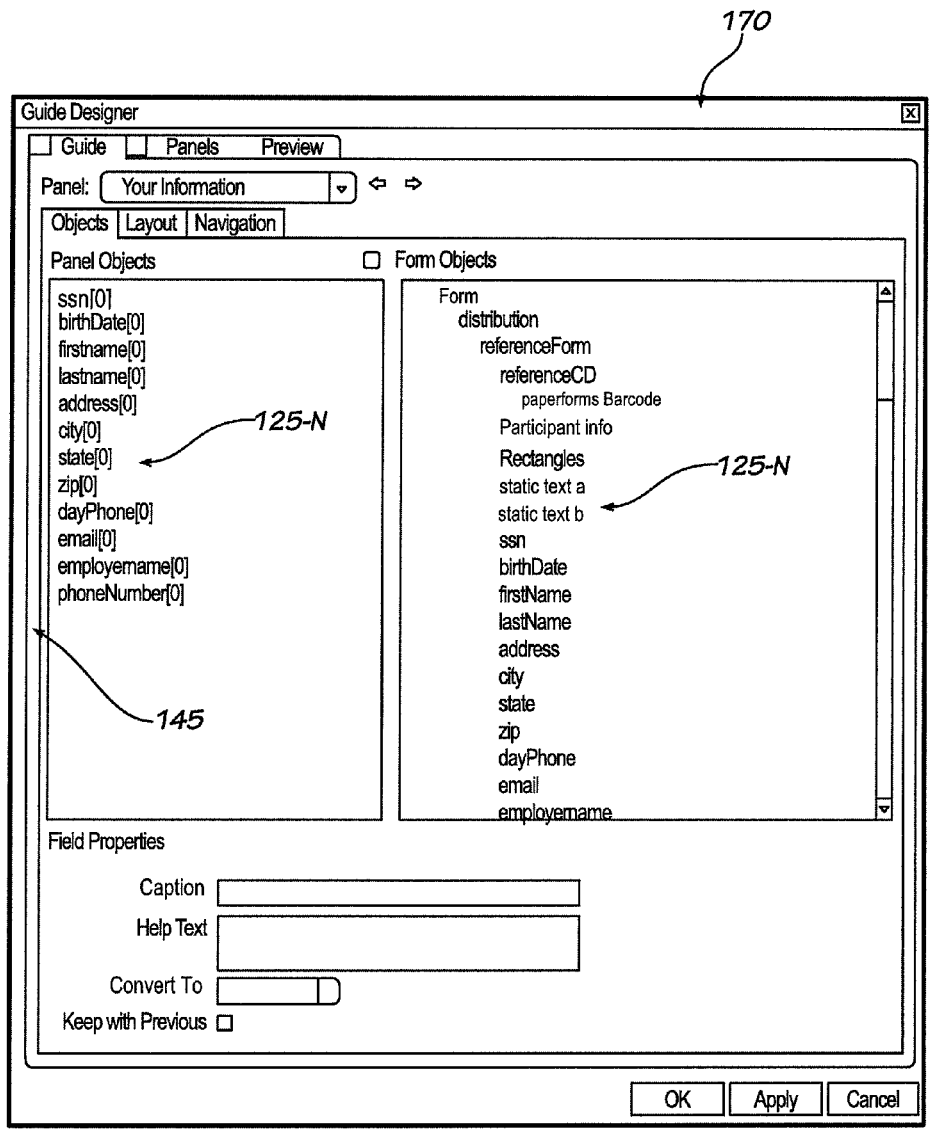
FIG. 5 is a screen shot of a wizard panel generator containing the set of objects available for a plurality of panels, a listing of panels, and a listing of those objects that are contained within each panel in the listing of panels, according to one embodiment disclosed herein.

FIG. 5 is an example screen shot of the wizard panel generator 170 displaying a set of objects 125-N for use on the wizard panels. On the right hand side of the wizard panel generator 170, the wizard panel generator 170 displays the available set of objects 125-N from the electronic form 120. On the left hand size, the wizard panel generator 170 presents those objects 125-N (that correspond to the objects 125-N from the electronic form 120) chosen to display within a wizard panel 135-1. The user 108 can order the objects 125-N according to a hierarchical order 145. A hierarchical order 145 may be required if, for example, it is necessary to obtain a user's social security number prior to obtaining the user's birth date. The presentation of the objects 125-$n$ from the electronic form 120, along with the objects 125-N chosen to display within a wizard panel 135-1, facilitates the selection of objects 125-N to be added to or removed from the wizard panels. The wizard panel generator 170 allows the user 108 to override some of the field properties of the objects 125-N or supplement missing information for those objects 125-N.

Figure 6:
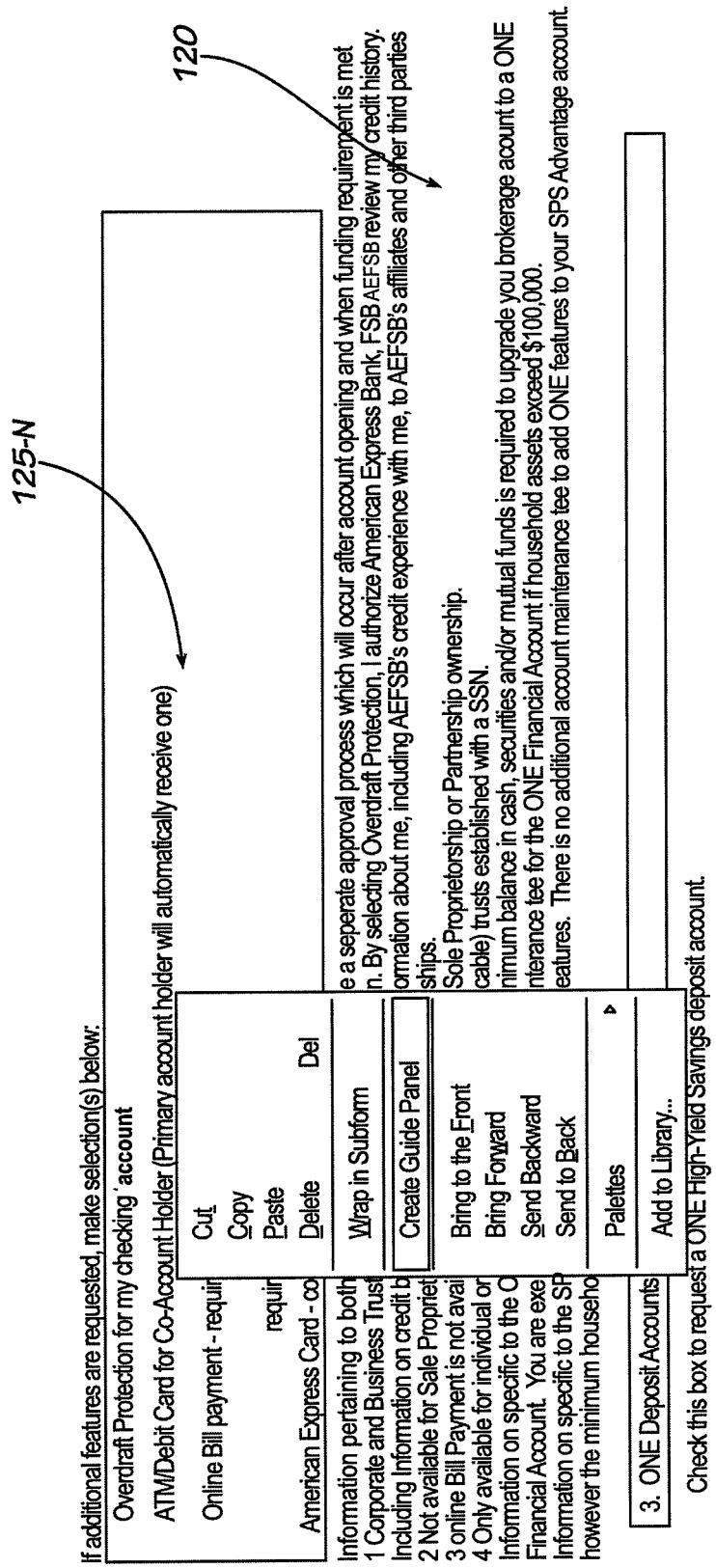
FIG. 6 is a screen shot of a selection of content from an electronic form that is to be capture for creation of a wizard panel containing that captured content, according to one embodiment disclosed herein.

FIG. 6 is an example screen shot of an electronic form 120 containing objects 125-N. A user 108 (i.e., a developer generating a wizard panel 135) selects a grouping of objects 125-N from the electronic form 120, and the wizard panel generator 170 creates a wizard panel 135-1 (containing that grouping of objects 125-N as corresponding objects 125-N on the wizard panel 135) when the user 108 selects a create wizard panel option from the wizard panel generator 170. The user 108 can also select objects 125-N (that are not grouped together on the electronic form 120) to create a wizard panel 135-1. For example, the user 108 can select individual objects 125-N that are not grouped together on the electronic form 120, and the wizard panel generator 170 creates a wizard panel 135-1 containing those objects 125-N (the former objects 125-N from the electronic form 120). Once the wizard panel generator 170 creates a wizard panel 135-1 in this manner, the user 108 can select the layout, style, etc., of the wizard panel 135-1 via the wizard panel generator 170.

Figure 7:
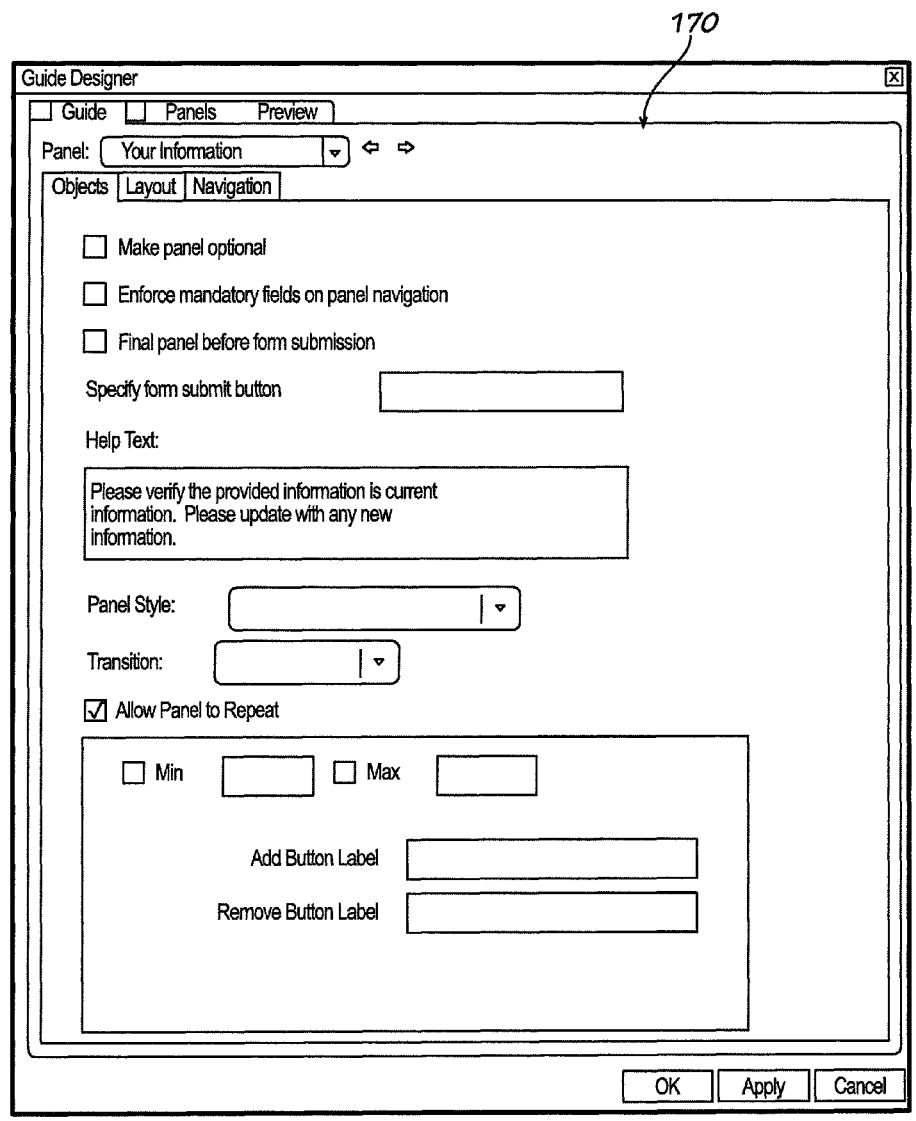
FIG. 7 is a screen shot of a wizard panel generator displaying layout selection information, according to one embodiment disclosed herein.

FIG. 7 is an example screen shot of a wizard panel generator 170 displaying options associated with a wizard panel 135-1 that can be specified by the user 108. For example, using the wizard panel generator 170, the user 108 can make the wizard panel 135-1 optional in the wizard, enforce mandatory fields within the wizard panel 135-1, specify the wizard panel 135-1 is the final panel prior to submission of user 108 entered input, etc. Making a wizard panel 135-1 optional hides the wizard panel 135-1 from the navigation guide. In one configuration, the wizard panel generator 170 only displays the wizard panel 135-1 when a user 108, such as a developer, navigates to that particular wizard panel 135-1. Enforcing mandatory fields on a wizard panel 135-1 forces a user 108 to fill in required objects 125-1 (i.e., form fields, etc) prior to navigating to a subsequent wizard panel 135-1. Identifying a wizard panel 135-1 as the final wizard panel 135-1 prior to submission requires the user 108 (i.e., the developer creating the wizard panels) to specify the wizard panel 135-1 submit button.

Figure 8:
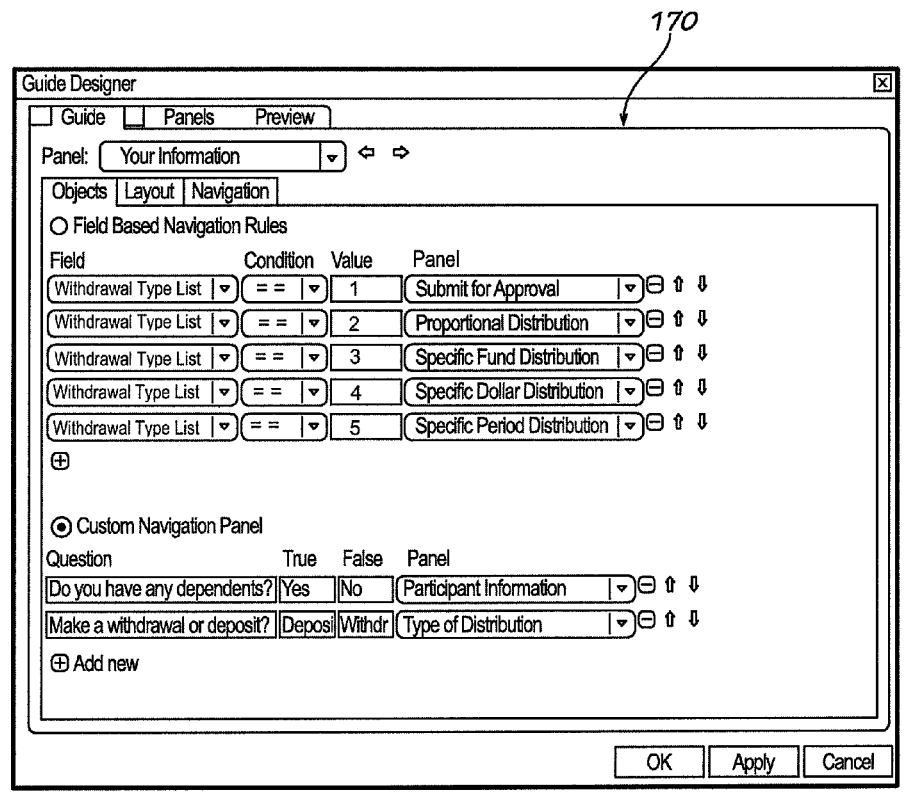
FIG. 8 is a screen shot of a wizard panel generator displaying navigation selection information, according to one embodiment disclosed herein.

FIG. 8 is an example screen shot of a wizard panel generator 170 displaying policies 150 associated with the wizard panel 135-1. For example, a policy 150 can be field based. If a user using a wizard to enter input into a field in the wizard panel 135-1 indicates the user has five dependents, the wizard generating process 140-2 can configure the wizard to associate a policy 150 with that field such that the input (indicating the user has five dependents) triggers the presentation of a wizard panel 135-1 that can accept input for five dependents (i.e., name, date of birth, etc.). In other words, the wizard keys next wizard panel 135-1 that is presented to the user off of the answer the user provides to the previous wizard panel 135-1.

Figure 9:
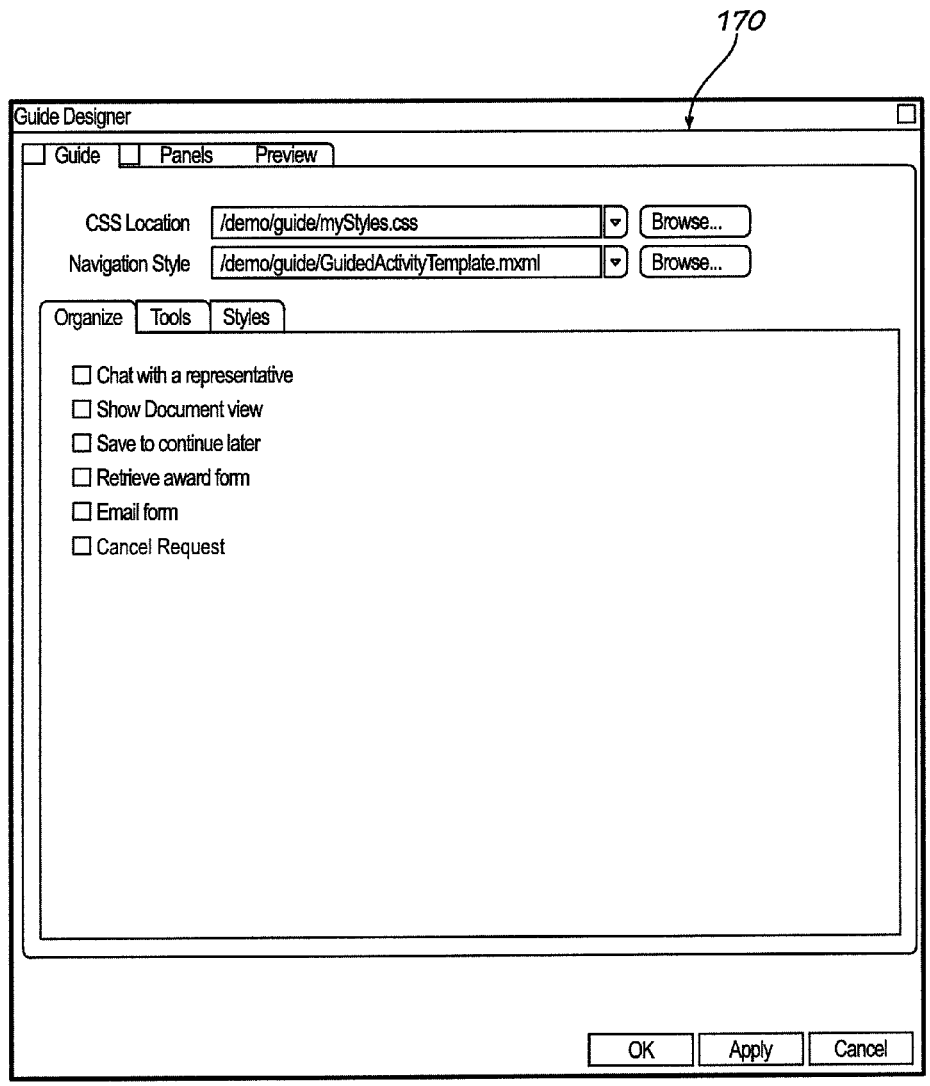
FIG. 9 is a screen shot of a wizard panel generator displaying available tools to associate with a wizard panel, according to one embodiment disclosed herein.

FIG. 9 is an example screen shot of a wizard panel generator 170 displaying tools that can be associated with a wizard panel 135-1. For example, a user 108 generating the wizard panel 135-1 can operate the wizard panel generator 170 to associate a chat application that provides a chat session with the wizard panel 135-1 such that a user entering data into the wizard panel 135-1 has the option to chat with a representative should that user require additional assistance when filling out the wizard panel 135-1. A user 108 operating that wizard generator 170 can generate the wizard panel 135-1 to associate dynamic content sensitive help text to the wizard panel 135-1. For example, a user may type the first few letters of a word into a form field, and the wizard generating process 140-2 fills in the remaining letters.

Figure 10:
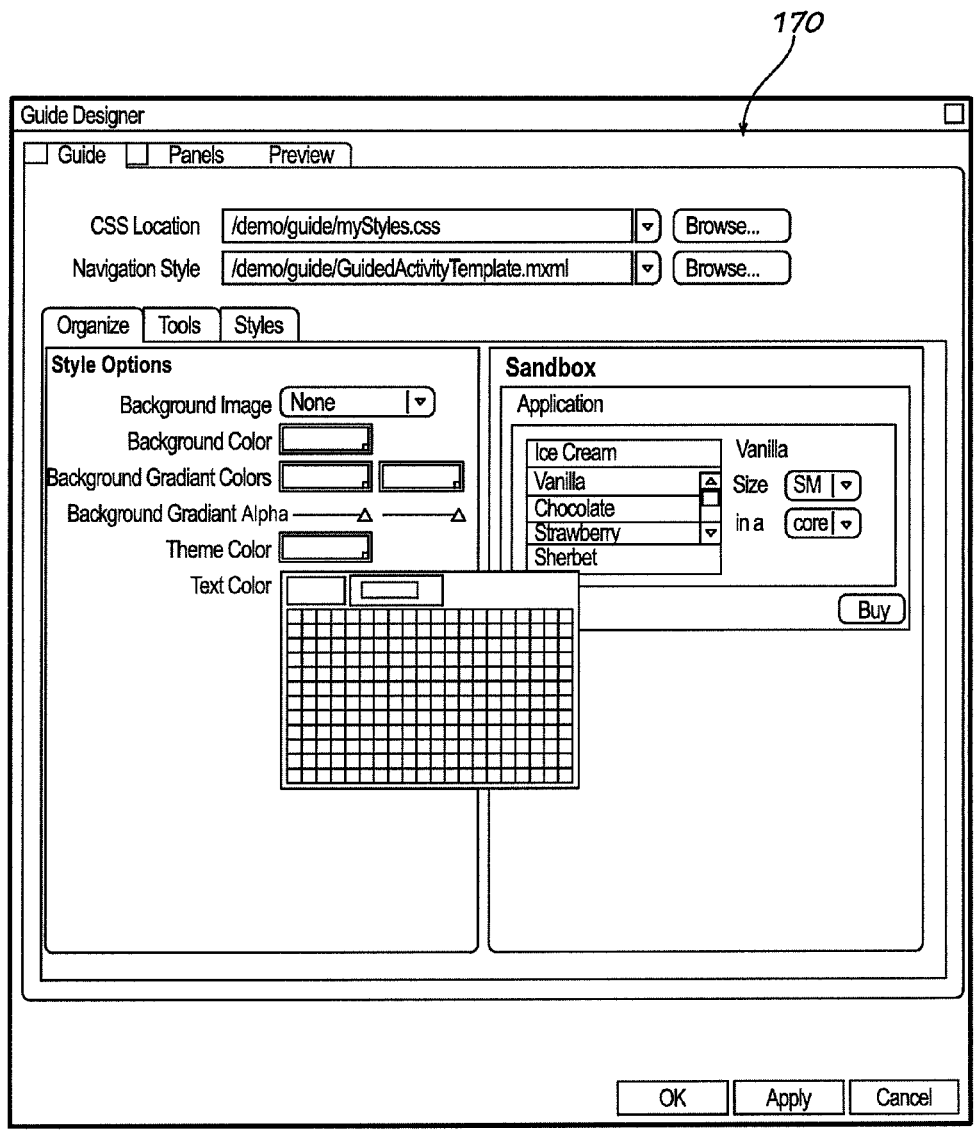
FIG. 10 is a screen shot of a wizard panel generator displaying style options available for generating a wizard panel, according to one embodiment disclosed herein.

FIG. 10 is an example screen shot of a wizard panel generator 170 displaying style options (i.e., the look and feel of the wizard panels 135) that can be associated with a wizard panel 135-1. A user 108 using the wizard panel generator 170 to generate the wizard panel 135-1 can use a default style for the wizard panel 135-1, or custom define the style (i.e., color, etc) of the wizard panel 135-1. The user 108 using the wizard panel generator 170 to generate wizard panels can modify the look and feel of the wizard panels, and view those changes immediately on the wizard panels. Changes to those styles can be overwritten on an existing style sheet, or the wizard panel generator 170 can create a new style sheet file for those new changes.

Further details of configurations explained herein will now be provided with respect to flow charts of processing steps that show the operations disclosed herein to perform the wizard creation process.

Figure 11:
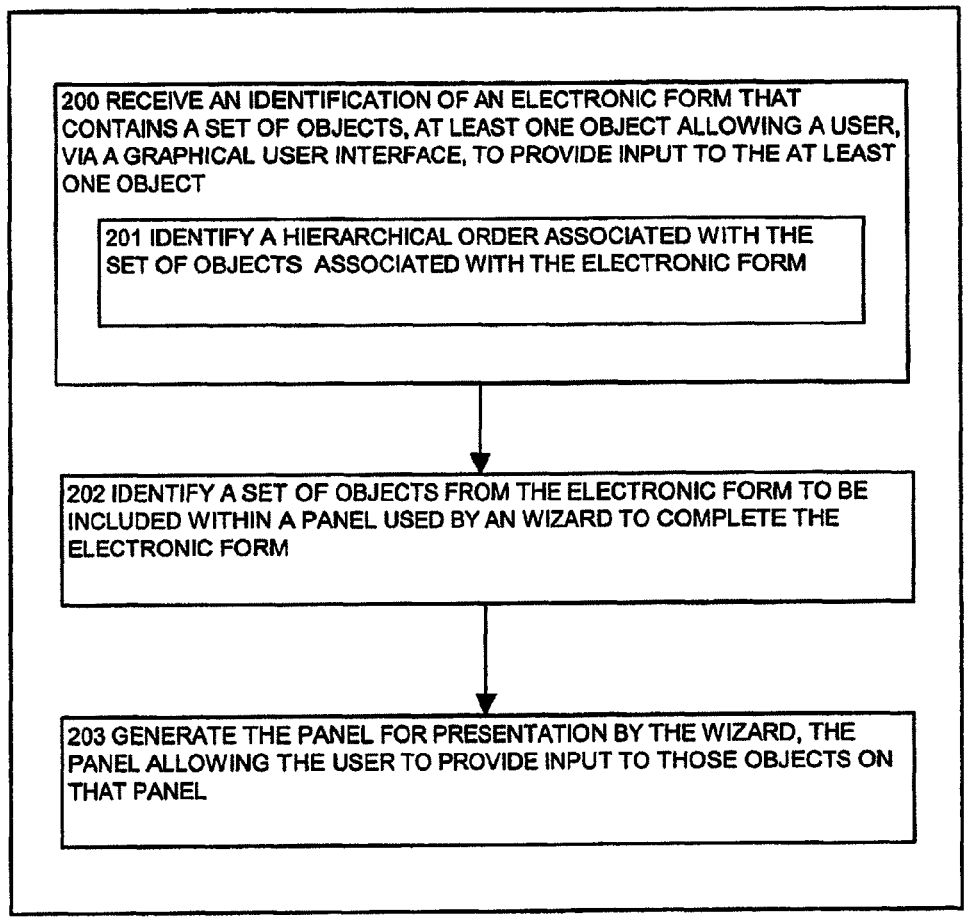
FIG. 11 illustrates a flowchart of a procedure performed by the system of FIG. 1, when the wizard generating process receives an identification of an electronic form that contains a set of objects, according to one embodiment disclosed herein.

FIG. 11 is an embodiment of the steps performed by the wizard generating process 140-2 when it receives an identification of an electronic form 120 that contains a set of objects 125-N.

In step 200, the wizard generating process 140-2 receives an identification of an electronic form 120 that contains a set of objects 125-N. At least one object 125-1 allows a user 108 (e.g. a wizard developer such as an application developer), via a graphical user interface 160, to provide input to the object 125-1. The electronic form 120 could be, for example, a job application form, a credit card application form, a tax form, etc. The set of objects 125-N on the electronic form 120 could be field forms in which a user 108 enters data such as name, social security number, address, telephone number, etc. The set of objects 125-N could also be check boxes and/or radio buttons, for example, "Please check off the following credit card options you are interested in obtaining". Sub-step 201 shows a configuration that uses a hierarchical order of objects.

In step 201, the wizard generating process 140-2 identifies a hierarchical order 145 associated with the set of objects 125-N associated with the electronic form 120. In an example embodiment, the hierarchical order 145 associated with the set of objects 125-N indicates a sequence in which a user 108 enters data for those objects 125-N. For example, when filling out a job application form, it may be necessary to ask the applicant's social security number prior to obtaining any additional information. A wizard in accordance with this configuration spares those job applicants who do not know their social security number the unnecessary effort of filling out the job application form since the job application process cannot continue without the applicant's social security number.

In step 202, the wizard generating process 140-2 identities a set of objects 125-N from the electronic form 120 to be included within a wizard panel 135-1 used by a wizard to complete the electronic form 120. In one example embodiment, the wizard generating process 140-2 automatically identifies the set of objects 125-N from the electronic form 120 without any input from the user 108 (i.e., the developer generating the wizard panel 135). In another example embodiment, the wizard generating process 140-2 accepts input from a user 108 (i.e., the developer generating the wizard panel 135) to select those objects 125-N within the electronic form 120 that should be included in the wizard panels.

In step 203, the wizard generating process 140-2 generates the wizard panel 135-1 for presentation by the wizard. The wizard panel 135-1 allows a user 108 to provide input to those objects 125-N on that wizard panel 135-1. The wizard generating process 140-2 generates a wizard panel 135-1 with the objects 125-N that were selected from the electronic form 120. The wizard generating process 140-2 presents a wizard panel 135-1 to a user 108 with form fields, radio buttons, check boxes, etc., in which the user 108 can enter input. The wizard panel 135-1 can also provide additional interactive assistance to the user 108 (such as links to help guides, interactive chat sessions, etc) to assist the user 108 in entering input into the wizard panel 135-1.

Figure 12:
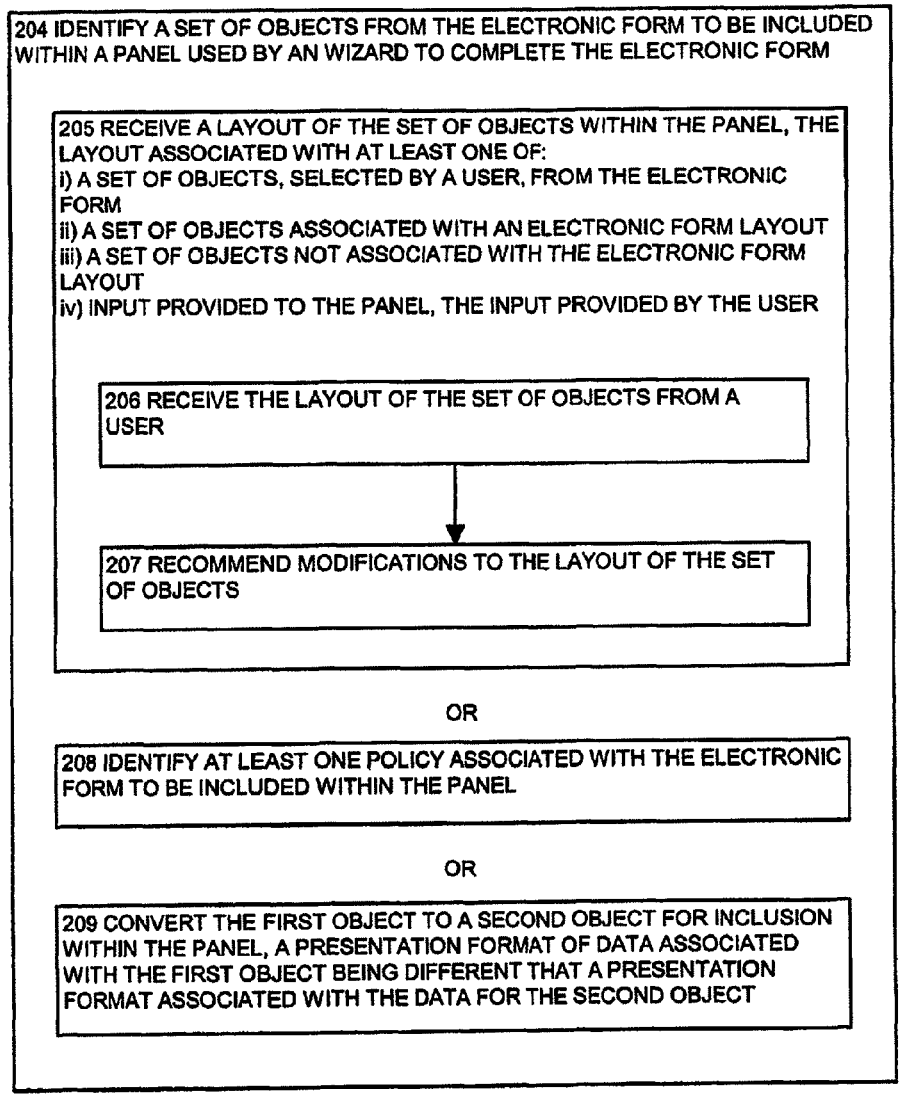
FIG. 12 illustrates a flowchart of a procedure performed by the system of FIG. 1, when the wizard generating process identifies a set of objects from the electronic form to be included within a panel used by a wizard to complete the electronic form, according to one embodiment disclosed herein.

FIG. 12 is an embodiment of the steps performed by the wizard generating process 140-2 when it identifies a set of objects 125-N from the electronic form 120 to be included within a wizard panel 135-1.

In step 204, the wizard generating process 140-2 identifies a set of objects 125-N from the electronic form 120 to be included within a wizard panel 135-1 used by a wizard to complete the electronic form 120. The wizard generating process 140-2 can automatically identify a set of objects 125-N to be included in a wizard panel 135-1 or plurality of wizard panels without any action from a user 108. The wizard generating process 140-2 can also receive the set of objects 125-N identified by a user 108. A user can selects groups of objects 125-N from the electronic form 120 for inclusion in wizard panels, regardless of whether those objects 125-N are grouped together on the electronic form 120.

In step 205, the wizard generating process 140-2 receives a layout of the set of objects 125-N within the wizard panel 135-1. The layout can include, for example, how objects 125-N within the wizard panel 135-1 are grouped. For example, a wizard panel 135-1 may contain twelve form fields. The twelve form fields may be grouped in sets of threes, with the form fields in each of the three group associated with the other form fields in that group. In an example embodiment, the layout is maintained via eXtensible Markup Language (XML). The layout is associated with at least one of:

i) A set of objects 125-N, selected by a user 108, from the electronic form 120: The user 108 selects a grouping of objects 125-N from the electronic form 120, or may select individual objects 125-N from the electronic form 120 regardless of where on the electronic form 120 those individual objects 125-N are presented.

ii) A set of objects 125-N associated with an electronic form 120 layout: The wizard generating process 140-2 identifies a set of objects 125-N from an electronic form 120, and generates a wizard panel 135-1 based on the layout of those objects 125-N on the electronic form 120.

iii) A set of objects 125-N not associated with the electronic form 120 layout: The wizard generating process 140-2 identifies a layout for the wizard panel 135-1 based on, for example, a hierarchical order 145 of the set of objects 125-N on the electronic form 120, even though the layout for the wizard panel 135-1 may not be associated with the layout of those objects 125-N on the electronic form 120.

iv) Input provided to the wizard panel 135-1 by the user 108: In an example embodiment, the wizard generating process 140-2 identifies a layout of the wizard panel 135-1 based on input to that wizard panel 135-1 provided by a user 108. For example, a 'submit panel' button may be inserted into a wizard panel 135-1 when a user finished filling in all the required form fields. The 'submit panel' button may be located directly below the last form field to indicate to the user 108 that there are no additional form fields to be filled out on that wizard panel 135-1.

In step 206, the wizard generating process 140-2 receives the layout of the set of objects 125-N from a user 108. The wizard generating process 140-2 provides default layouts for the wizard panels. A user 108 may use the default layouts, modify the default layouts and/or create new layouts for the wizard panels.

In step 207, the wizard generating process 140-2 recommends modifications to the layout of the set of objects 125-N. In an example embodiment, a user 108 modifies a default layout, creating a new layout for a wizard panel 135-1. The wizard generating process 140-2 identifies that the new layout prevents all the objects 125-N in the wizard panel 135-1 from being displayed. The wizard generating process 140-2 recommends modifications to the layout of the wizard panel 135-1, for example, reducing the white space between objects 125-N on the wizard panel 135-1, converting an object 125-1 of one type to an object of a different type 125-1, etc., such that all the objects 125-N on the wizard panel 135-1 will be displayed.

Alternatively, in step 208, the wizard generating process 140-2 identifies at least one policy 150 associated with the electronic form 120 to be included within the wizard panel 135-1. The electronic form 120 may have policies 150, such as validation rules, associated with form fields. For example, the electronic form 120 may require that a user 108 fill in a telephone number with a particular format for the telephone number. Or, the electronic form 120 may require that certain form fields on the electronic form 120 must be filled out, while other form fields are optional. The wizard generating process 140-2 identifies any policies 150, or validation rules, associated with the electronic form 120, and includes these policies 150 when generating the wizard panels. Thus, required form fields within the electronic form 120 become required form fields within the wizard panel 135-1.

Alternatively, in step 209, the wizard generating process 140-2 converts the first object to a second object for inclusion within the wizard panel 135-1 such that presentation format of data associated with the first object is different that a presentation format associated with the data for the second object. The wizard generating process 140-2 can convert an object 125-1 on the electronic form 120 to a different type of object 125-1 when generating the wizard panel 135-1. For example, the electronic form 120 may contain radio buttons. The wizard generating process 140-2 may convert the radio buttons to a drop down menu when creating the wizard panel

135-1. Thus, the electronic form 120 gathers input from the user 108 via the radio buttons, but the wizard panel 135-1 gathers input from the user 108 via a drop down menu.

Figure 13:
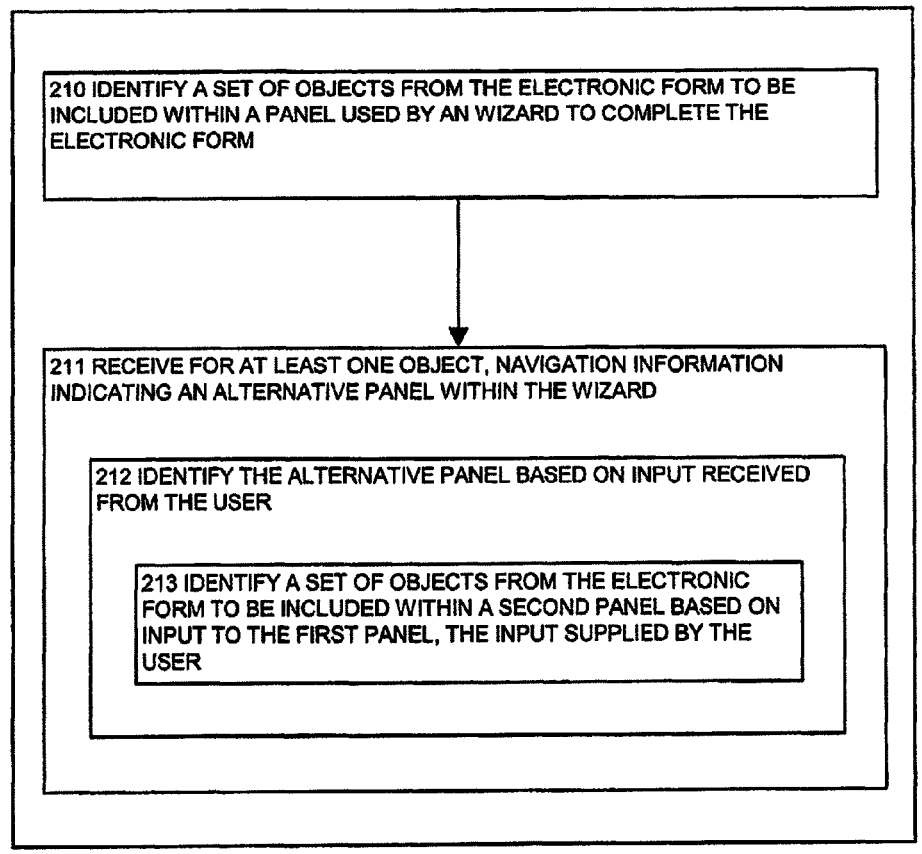
FIG. 13 illustrates a flowchart of a procedure performed by the system of FIG. 1, when the wizard generating process identifies a set of objects from the electronic form to be included within a panel, and receives for at least one object, navigation information indicating an alternative panel within the wizard, according to one embodiment disclosed herein.

FIG. 13 is an embodiment of the steps performed by the wizard generating process 140-2 when it identifies a set of objects 125-N from the electronic form 120 to be included within a wizard panel 135-1.

In step 210, the wizard generating process 140-2 identifies a set of objects 125-N from the electronic form 120 to be included within a wizard panel 135-1 used by a wizard to complete the electronic form 120. The set of objects 125-N can include form fields, captions associated with those form fields, etc. Within the wizard panel generator 170, the user 108 can override the captions associated with the form fields, and modify those captions. The wizard generating process 140-2 can also identify objects 125-N within the electronic form 120 that are associated with other objects 125-N within the electronic form 120. For example, the wizard generating process 140-2 identifies labels (i.e., captions), form fields, and identifies that the labels are associated with the form fields.

In step 211, the wizard generating process 140-2 receives for at least one object 125-1, navigation information indicating an alternative panel within the wizard. The wizard panel generator 170 allows the user 108 to create multiple wizard panels and organize the wizard panels in any order. The wizard panels do not have to follow any flow associated with the electronic form 120. That is, the electronic form 120 may include multiple pages, in a sequential order, but this does not mean that the wizard panels must also include the same number of wizard panels as the pages in the electronic form 120. The sequence of wizard panels can be modified by a user 108 or by policies 150 (i.e., validation rules) associated with the wizard panels. Thus, information associated with one object 125-N can trigger a change in the sequence of the delivery of a wizard panel 135-1 (i.e., an alternative wizard panel 135) to the user 108.

In step 212, the wizard generating process 140-2 identifies the alternative panel based on input received from the user 108. The wizard panel generator 170 allows a user 108 to specify the sequence of wizard panels based on input (received from a user 108) to objects on a wizard panel 135-1. For example, a user 108 enters salary information into a tax form wizard panel 135-1. The salary information is below a specified threshold, triggering a next sequential wizard panel 135-1 that requires additional input from the user 108 to determine if the user 108 qualifies for a tax credit.

In step 213, the wizard generating process 140-2 identifies a set of objects 125-N from the electronic form 120 to be included within a second wizard panel 135-1 based on input (supplied by the user 108) to the first wizard panel 135-1. In an example embodiment, the electronic form 120 requires a user 108 to supply data associated with each of the dependents for which the user 108 is responsible. The wizard generating process 140-2 identifies these form fields (associated with dependant data) on the electronic form 120. The wizard generating process 140-2 generates a wizard panel 135-1 that requires a user 108 to fill in a form field indicating how many dependants the user 108 has. Based on that number, the wizard generating process 140-2 generates another wizard panel 135-1 that has enough form fields (i.e., objects 125-N) to accept data associated with each of the dependants the user 108 specified within the previous wizard panel 135-1.

Figure 14:
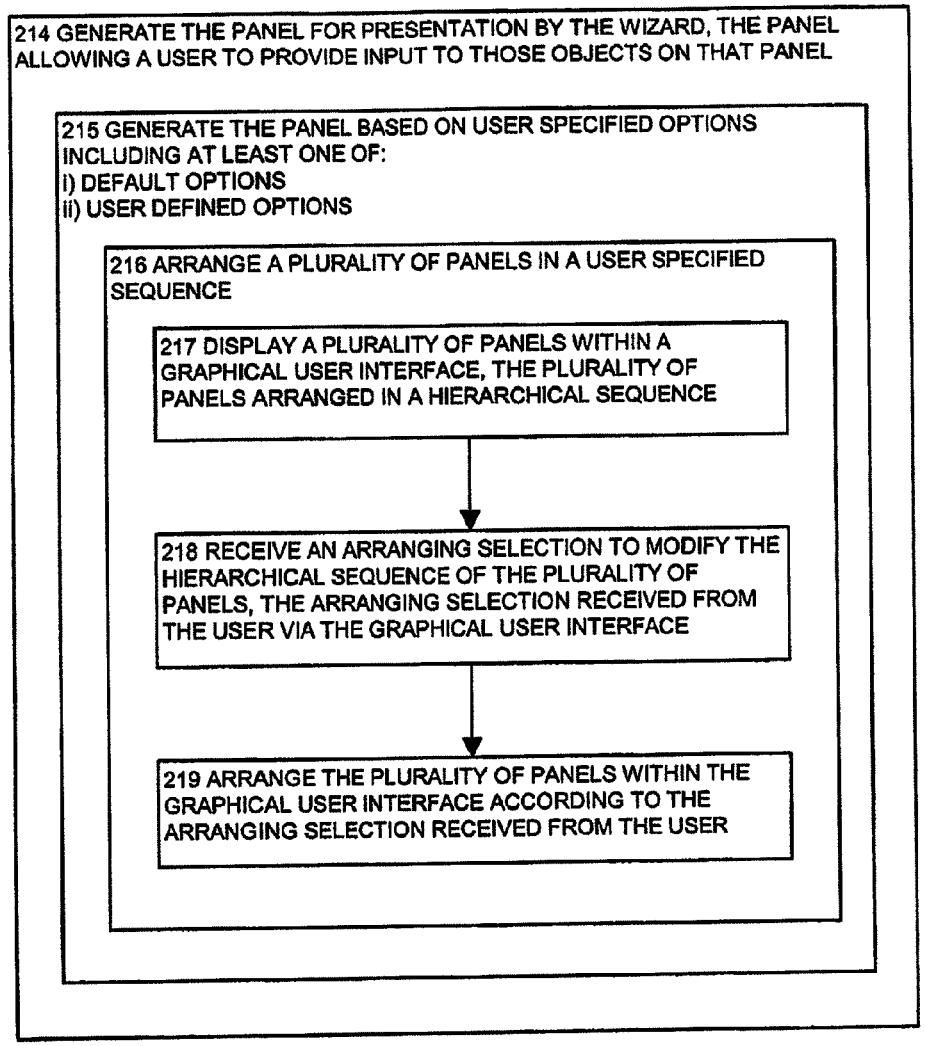
FIG. 14 illustrates a flowchart of a procedure performed by the system of FIG. 1, when the wizard generating process generates the panel for presentation by the wizard, the panel allowing a user to provide input to those objects on that panel, according to one embodiment disclosed herein.

FIG. 14 is an embodiment of the steps performed by the wizard generating process 140-2 when it generates the wizard panel 135-1 for presentation by the wizard.

In step 214, the wizard generating process 140-2 generates the wizard panel 135-1 for presentation by the wizard. The wizard panel 135-1 allows a user 108 to provide input to those objects 125-N on that wizard panel 135-1. The wizard generating process 140-2 generates the wizard panels from an electronic foam 120 without any additional action provided by the user 108. However, the wizard generating process 140-2 provides the capability for a user 108 to modify and/or customize the wizard panels.

In step 215, the wizard generating process 140-2 generates the wizard panel 135-1 based on user 108 specified options including at least one of:
 i) Default options: The wizard generating process 140-2 provides default options including default 'look and feel' of the wizard panels, default layout, default style and color, etc.
 ii) User defined options: The wizard generating process 140-2 provides the user 108 with the ability to customize the wizard panels, including the style, color, layout, etc.

In step 216, the wizard generating process 140-2 arranges the plurality of wizard panels within the graphical user interface 160 according to the arranging selection received from the user 108. For example, the wizard generating process 140-2 rearranges the plurality of wizard panels in the "Amount of Distribution" section such that "Specific Period Distribution" wizard panel 135-1 is before the "Specific Dollar Distribution" wizard panel 135-1.

In step 217, the wizard generating process 140-2 displays a plurality of wizard panels within a graphical user interface 160. The plurality of wizard panels is arranged in a hierarchical sequence/order 145. FIG. 4 displays the plurality of wizard panels grouped into sections of wizard panels, such as "Participant Information", "Reason for Distribution", "Amount of Distribution", and "Submit for Approval". Each of those sections contains wizard panels that are associated with that section. For example, the wizard panels "Your Information" and "Applicable Accounts" are associated with the grouping titled "Participant Information".

The hierarchical order 145 is based on the sequence in which the wizards panels are displayed to the user 108. In this example, the wizard panels are associated with an electronic form 120 pertaining to the distribution of a 401k plan. The participant information must be obtained prior to determining what amount of distribution is possible from the account specified by the user 108. Only after all the necessary information has been obtained from the user 108 can the "Submit for Approval" wizard panel 135-1 be presented to the user 108.

In step 218, the wizard generating process 140-2 receives an arranging selection to modify the hierarchical sequence of the plurality of wizard panels. The arranging selection is received from the user 108 via the graphical user interface 160. In an example embodiment, the user 108 uses an input device 116, such as a mouse, to select one of the wizard panels to move that wizard panel 135-1 to a different location within the hierarchical order 145. For example, the user 108 selects "Specific Period Distribution" wizard panel 135-1 (contained within the "Amount of Distribution" section) and moves it from after the "Specific Dollar Distribution" wizard panel 135-1 to before the "Specific Dollar Distribution" wizard panel 135-1.

In step 219, the wizard generating process 140-2 arranges the plurality of wizard panels within the graphical user interface 160 according to the arranging selection received from the user 108. For example, the wizard generating process 140-2 rearranges the plurality of wizard panels in the "Amount of Distribution" section such that "Specific Period Distribution" wizard panel 135-1 is before the "Specific Dollar Distribution" wizard panel 135-1.

Figure 15:
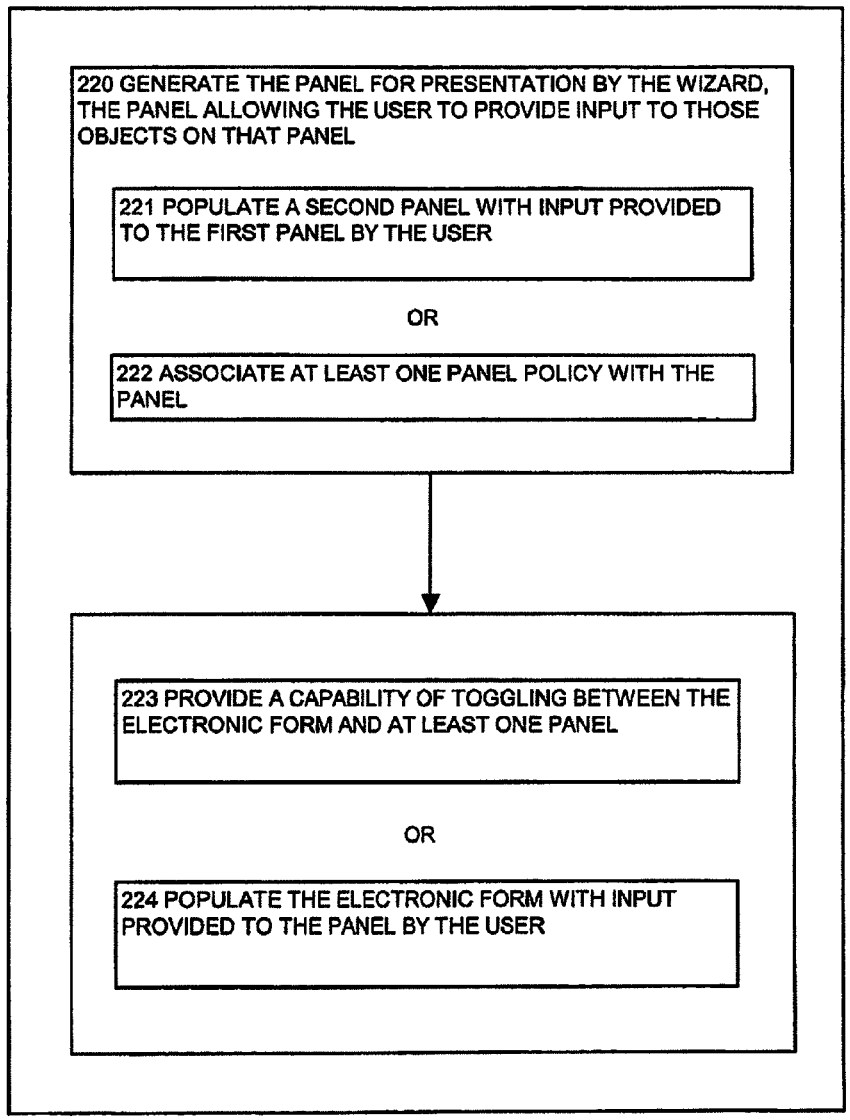
FIG. 15 illustrates a flowchart of a procedure performed by the system of FIG. 1, when the wizard generating process generates the panel for presentation by the wizard and provides a capability of toggling between the electronic form and the panel, according to one embodiment disclosed herein.

FIG. 15 is an embodiment of the steps performed by the wizard generating process 140-2 when it dynamically generates the wizard panel 135-1 for presentation by the wizard.

In step 220, the wizard generating process 140-2 generates the wizard panel 135-1 for presentation by the wizard. The wizard panel 135-1 allows a user 108 to provide input to those objects 125-N on that wizard panel 135-1.

In step 221, the wizard generating process 140-2 populates a second wizard panel 135-1 with input provided to a first wizard panel 135-1 by the user 108. In an example embodiment, a user 108 provides input to a first wizard panel 135-1, such as a bank account number. The wizard generating process 140-2 populates a second wizard panel 135-1 with the user's 108 bank account number such that the user 108 does not have to supply the bank account number to the second wizard panel 135-1. In an example embodiment, the wizard generating process 140-2 is able to associate that the first wizard panel 135-1 and the second wizard panel 135-1 both utilize the same object 125-1 (i.e., the bank account number) even if those objects 125-N are not associated within the electronic form 120.

Alternatively, in step 222, the wizard generating process 140-2 associates at least one panel policy 150 with the panel. The wizard generating process 140-2 obtains policies 150 from the electronic form 120 and applies those policies 150 to the wizard panels that are generated by the wizard generating process 140-2. In an example embodiment, the wizard generating process 140-2 provides policies 150 in the form of field based navigation rules. For example, a wizard panel 135-1 has an object 125-1, such as a field form. An evaluation condition is applied to that field form, such as 'equals, "greater than", "less than", etc. A value determines the threshold for the evaluation condition, for example "greater than five". The navigation rule identifies a subsequent wizard panel 135-1 to be displayed if the evaluation condition is met. The navigation rule can be, for example, if the user 108 enters a value greater than five in a particular field form, display a certain wizard panel 135-1.

In an example embodiment, the wizard generating process 140-2 provides policies 150 in the form of custom navigation wizard panels. In this scenario, the user 108 (i.e., a customer) is presented with a series of Boolean (i.e., "yes", "no") questions. The Boolean questions are presented to the user 108 one at a time. In an example embodiment, when the user 108 answers 'yes' to a Boolean question, a new wizard panel is presented to the user 108. That new wizard panel 135-1 may already exist, or may be dynamically generated based on the user's 108 answer to the Boolean question. If the user 108 answers 'no', the next Boolean question is presented to the user 108. If the user 108 answers all of the Boolean questions 'no', the normal navigation route is used (i.e., the 'normal' sequence of wizard panels). The user 108 (i.e., a developer) has the capability to arrange and/or rearrange the order of the Boolean questions presented to the user 108 (i.e., the customer).

In step 223, the wizard generating process 140-2 provides a capability of toggling between the electronic form 120 and at least one wizard panel 135-1. The wizard generating process 140-2 allows a user 108 (i.e., a developer) to toggle between an electric form 120 view and a wizard panel 135-1 view without losing any information either online or offline. For example, if a user 108 changes a caption on a form field (i.e., an object 125-1) on the electronic form 120, that caption is also changed within the associated wizard panel 135-1 that contains that form field (i.e., an object 125-1). The user 108 can override the caption within the wizard panel 135-1.

In step 224, the wizard generating process 140-2 populates the electronic form 120 with input provided to the wizard panel 135-1 by the user 108. A user 108 can enter input to a wizard panel 135-1 (generated by the wizard generating process 140-2) and that input populates the electronic form 120 from which the wizard panel 135-1 was dynamically generated. In an example embodiment, a user 108 fills wizard panels with data, and that data is saved to an electronic document 120 that is emailed as an attachment.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A non-transitory computer-readable medium comprising program code for:

receiving, by a wizard generating application, selection of a preexisting electronic form, the preexisting electronic form comprising a plurality of form objects, the preexisting electronic form not corresponding to a preexisting wizard when received by the wizard generating application;

dynamically generating, by the wizard generating application, a set of wizard objects to be used in a wizard to be generated for the preexisting electronic form, at least one wizard object in the set of wizard objects based at least in part on a form object from the plurality of form objects, at least one wizard object in the set of wizard objects binding with a corresponding form object from the plurality of form objects;

dynamically determining, by the wizard generating application, a hierarchical order for the set of wizard objects to be used in the wizard;

dynamically determining, by the wizard generating application, a layout for at least one wizard panel for the wizard, the layout based at least in part on the determined hierarchical order, the layout including the generated set of wizard objects; and dynamically generating, by the wizard generating application, the wizard by at least dynamically generating the layout for the at least one wizard panel.

2. The non-transitory computer-readable medium of claim 1, further comprising program code for:

receiving, by the wizard generating application, an input indicating a first modification to the dynamically determined layout; and updating, by the wizard generating application, the dynamically determined layout based at least in part on the input indicating the first modification.

3. The non-transitory computer-readable medium of claim 2, further comprising program code for:

recommending, by the wizard generating application, a second modification to the layout based at least in part on the first modification.

4. The non-transitory computer-readable medium of claim 1, further comprising program code for:

receiving, by the wizard generating application, a navigational input indicating an alternative panel for the dynamically determined layout for the at least one wizard panel for the wizard; and updating, by the wizard generating application, the dynamically determined layout based at least in part on the received navigational input.

5. The non-transitory computer-readable medium of claim 1, further comprising program code for:
determining, by the wizard generating application, at least one policy associated with the preexisting electronic form; and
including, by the wizard generating application, the determined at least one policy within the wizard.

6. The non-transitory computer-readable medium of claim 1, wherein a form object from the plurality of form objects binds with a wizard object from the dynamically generated set of wizard objects and wherein a presentation format of data associated with the form object is different than a presentation format of data associated with the wizard object.

7. The non-transitory computer-readable medium of claim 1, further comprising program code for:
displaying, by the wizard generating application, the layout for the at least one wizard panel within a graphical user interface;
receiving, by the wizard generating application, an input indicating modification of a hierarchical sequence for the at least one wizard panel; and
updating, by the wizard generating application, the layout based at least in part on the received input.

8. The method of claim 7, wherein at least one wizard object in the generated set of wizard objects in the generated wizard is configured to receive user input and wherein at least a portion of the preexisting electronic form is populated based on the received user input.

9. The non-transitory computer-readable medium of claim 1, further comprising program code for:
providing a capability of toggling between the preexisting electronic form and the generated wizard.

10. The non-transitory computer-readable medium of claim 1, further comprising program code for:
populating the preexisting electronic form based at least in part on input provided to the generated wizard.

11. A method comprising:
receiving, by a wizard generating application, selection of a preexisting electronic form, the preexisting electronic form comprising a plurality of form objects, the preexisting electronic form not corresponding to a preexisting wizard when received by the wizard generating application;
dynamically generating, by the wizard generating application, a set of wizard objects to be used in a wizard to be generated for the preexisting electronic form, at least one wizard object in the set of wizard objects based at least in part on a form object from the plurality of form objects, at least one wizard object in the set of wizard objects binding with a corresponding form object from the plurality of form objects;
dynamically determining, by the wizard generating application, a hierarchical order for the set of wizard objects to be used in the wizard;
dynamically determining, by the wizard generating application, a layout for at least one wizard panel for the wizard, the layout based at least in part on the determined hierarchical order, the layout including the generated set of wizard objects; and
dynamically generating, by the wizard generating application, the wizard by at least dynamically generating the layout for the at least one wizard panel.

12. The method of claim 11, further comprising:
receiving, by the wizard generating application, an input indicating a first modification to the dynamically determined layout; and
updating, by the wizard generating application, the dynamically determined layout based at least in part on the input indicating the first modification.

13. The method of claim 12, further comprising:
recommending, by the wizard generating application, a second modification to the layout based at least in part on the first modification.

14. The method of claim 11, further comprising:
receiving, by the wizard generating application, a navigational input indicating an alternative panel for the dynamically determined layout for the at least one wizard panel for the wizard; and
updating, by the wizard generating application, the dynamically determined layout based at least in part on the received navigational input.

15. The method of claim 11, further comprising:
determining, by the wizard generating application, at least one policy associated with the preexisting electronic form; and
including, by the wizard generating application, the determined at least one policy within the wizard.

16. The method of claim 11, wherein a first object from the plurality of form objects binds with a second object from the dynamically generated set of wizard objects and wherein a presentation format of data associated with the first object is different than a presentation format of data associated with the second object.

17. The method of claim 11, further comprising:
displaying, by the wizard generating application, the layout for the at least one wizard panel within a graphical user interface;
receiving, by the wizard generating application, an input indicating modification of a hierarchical sequence for the at least one wizard panel; and
updating, by the wizard generating application, the layout based at least in part on the received input.

18. A system, comprising:
a memory; and
a processor in communication with the memory, the processor configured for:
receiving, by a wizard generating application, selection of a preexisting electronic form, the preexisting electronic form comprising a plurality of form objects, the preexisting electronic form not corresponding to a preexisting wizard when received by the wizard generating application;
dynamically generating, by the wizard generating application, a set of wizard objects to be used in a wizard to be generated for the preexisting electronic form, at least one wizard object in the set of wizard objects based at least in part on a form object from the plurality of form objects, at least one wizard object in the set of wizard objects binding with a corresponding form object from the plurality of form objects;
dynamically determining, by the wizard generating application, a hierarchical order for the set of wizard objects to be used in the wizard;
dynamically determining, by the wizard generating application, a layout for at least one wizard panel for the wizard, the layout based at least in part on the determined hierarchical order, the layout including the generated set of wizard objects; and dynamically generating, by the wizard generating application, the wizard by at least dynamically generating the layout for the at least one wizard panel.

19. The system of claim 18, wherein the processor is further configured for:
receiving, by the wizard generating application, an input indicating a first modification to the dynamically determined layout; and
updating, by the wizard generating application, the dynamically determined layout based at least in part on the input indicating the first modification.

20. The system of claim 19, wherein the processor is further configured for:
recommending, by the wizard generating application, a second modification to the layout based at least in part on the first modification.

21. The system of claim 18, wherein the processor is further configured for:
receiving, by the wizard generating application, a navigational input indicating an alternative panel for the dynamically determined layout for the at least one wizard panel for the wizard; and
updating, by the wizard generating application, the dynamically determined layout based at least in part on the received navigational input.

22. The system of claim 18, wherein the processor is further configured for:
determining, by the wizard generating application, at least one policy associated with the preexisting electronic form; and
including, by the wizard generating application, the determined at least one policy within the wizard.

23. The system of claim 18, wherein the processor is further configured for:
displaying, by the wizard generating application, the layout for the at least one wizard panel within a graphical user interface;
receiving, by the wizard generating application, an input indicating modification of a hierarchical sequence for the at least one wizard panel; and
updating, by the wizard generating application, the layout based at least in part on the received input.

* * * * *